No. 825,196. PATENTED JULY 3, 1906.
J. S. DOAK & A. G. FARRINGTON.
INSECT DESTROYING MACHINE.
APPLICATION FILED SEPT. 9, 1904.
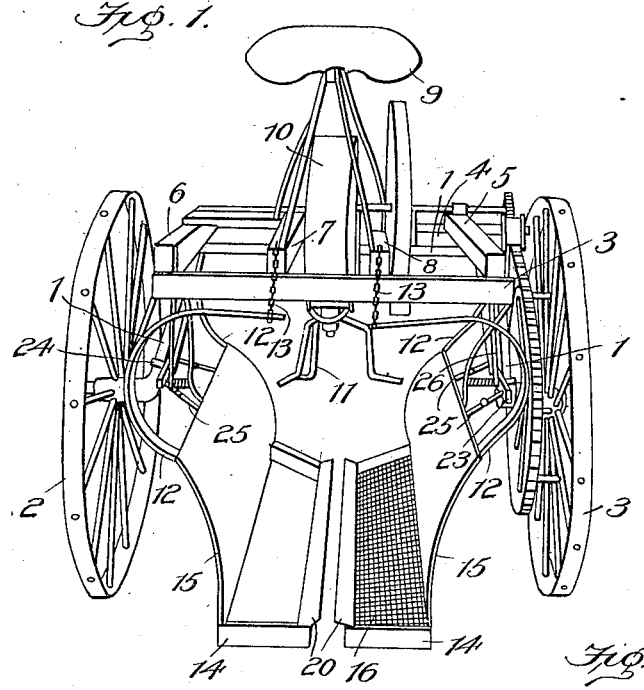
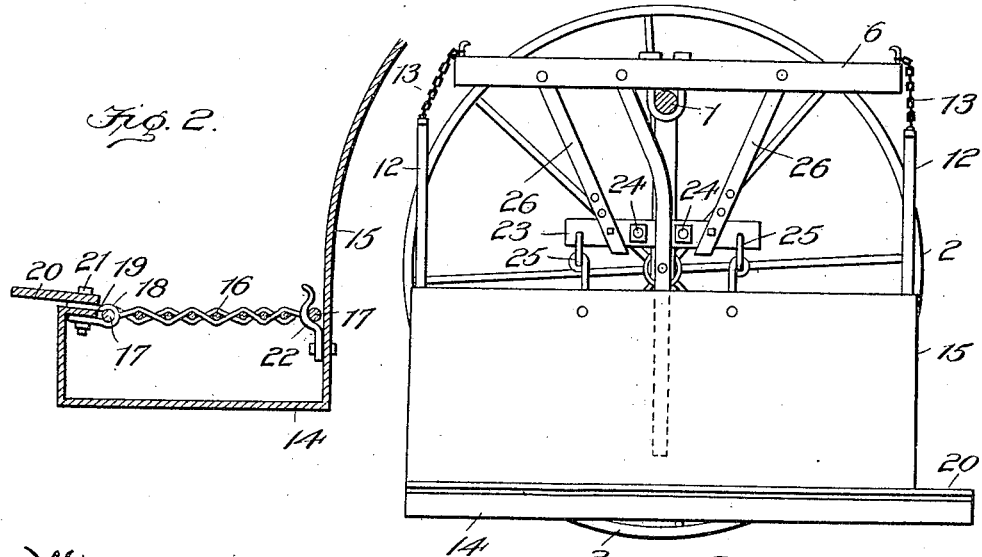
Witnesses:—
J. W. Stitt
F. J. Singleton
Inventors,
J. S. Doak and
A. G. Farrington,
By A. D. Jackson,
Attorney.

UNITED STATES PATENT OFFICE.

JOHN S. DOAK, OF BROWNWOOD, AND ALEXANDER G. FARRINGTON, OF YOAKUM, TEXAS.

INSECT-DESTROYING MACHINE.

No. 825,196.      Specification of Letters Patent.      Patented July 3, 1906.

Application filed September 9, 1904. Serial No. 223,877.

*To all whom it may concern:*

Be it known that we, JOHN S. DOAK, residing at Brownwood, Brown county, and ALEXANDER G. FARRINGTON, residing at Yoakum, Lavaca county, Texas, citizens of the United States, have invented certain new and useful Improvements in Insect-Destroying Machines, of which the following is a specification.

This invention relates to machines for destroying insects from growing plants; and the object is to improve the machine disclosed in our pending application, filed April 11, 1904, Serial No. 202,649.

We have improved the means for gathering the insects by improving the manner of adjusting the troughs, hereinafter described, as to height. It has been found that in some fields the ridges on which the cotton grows are made higher than in other fields. The troughs must be elevated above these ridges. It has also been found that in fields where the cotton is large the large or heavy bolls of cotton would drag through the troughs and would frequently drag the accumulated insects and squares and small bolls from the troughs. It is as important to gather the squares and small bolls as it is to gather the insects, because the squares and small bolls contain the insects, particularly the insect known as the "boll-weevil." Generally in cotton infested with boll-weevil the boll-weevil causes the squares and small bolls to fall from the cotton-plants.

One object of our invention is to prevent the heavy bolls from dragging the insects and the squares and small bolls from the troughs. Other objects and advantages will be fully explained in the following description.

Reference is had to the accompanying drawings, which form a part of this application and specification.

Figure 1 is a perspective view of the machine from the rear, showing a screen on one of the troughs. Fig. 2 is a cross-section of one of the troughs. Fig. 3 is a detail view illustrating the adjusting-bar for elevating and lowering the sides of the troughs.

Similar characters of reference are used to indicate the same parts throughout the several views.

Our machine is provided with a suitable truck composed of the arched axle 1, the wheels 2 and 3, and the frame-pieces 3, 4, 5, 6, 7, and 8. A seat 9 is mounted on the frame. Fig. 1 shows a rotary fan 10 and an agitator 11 for shaking the cotton-plants. The means for operating the latter elements will not be described or claimed in this application, because they are described and claimed in our pending application. The troughs are suspended from the frame by spring-arms 12 and by |chains 13. Each trough 14 has an upwardly and outwardly extending wing 15, and each trough is provided with a removable screen 16. Each screen is made of a frame 17 and suitable wire attached to the frame. The mesh of the screen is made large enough to let the insects and the squares and small bolls fall into the troughs and yet large enough to prevent the heavy bolls from dropping in the troughs and dragging the insects out. The screens are made easily removable, so that they can be taken out when not needed. The troughs are provided with flexible strips 20 to prevent the bruising of the growing plants. The frame of the screen is hinged to the troughs by any suitable number of hinges 18. The troughs have a flange 19 projecting inward from the inner edges. The trip 20 and the hinges 18 are attached to the flanges 19 in the manner shown in Fig. 2 by bolts 21. The screen is supported on the opposite side of the trough by a spring-catch 22, which may be riveted to the side of the trough.

The troughs are adjustable as to height by the chains 13 and by the adjusting-bars 23, which are attached to the axle by means of U-bolts 24. The wings 15 of the troughs are connected to the bars 23 by means of link-rods 25, so that there will be a flexible connection. The U-bolts may be moved up or down on the axle 1 for adjusting the sides of the troughs up or down. The braces 26 are bolted to the bars 23 and are provided with a series of holes, so that the braces can be bolted to the bar 23 when said bar is adjusted to different heights.

Having fully described our invention, what we claim as new, and desire to secure by Letters Patent, is—

An insect-destroying machine comprising a wheeled truck provided with an arched axle, adjustable bars, U-bolts for attaching said bars to said axle at different heights, troughs, and means for flexibly attaching said troughs to said bars and to said truck.

In testimony whereof I set my hand, in the presence of two witnesses, this 20th day of August, 1904.

JOHN S. DOAK.

In presence of—
 VERNON J. DEGGS,
 W. H. BALLOU.

In testimony whereof I set my hand, in the presence of two witnesses, this 22d day of August, 1904.

ALEXANDER G. FARRINGTON.

In presence of—
 ED B. CARRUTH,
 CARL PRICE.